No. 862,732. PATENTED AUG. 6, 1907.
E. A. HALL.
APPARATUS FOR SUPPLYING AIR AND REGULATING PRESSURE THEREOF.
APPLICATION FILED AUG. 25, 1904.
7 SHEETS—SHEET 1.
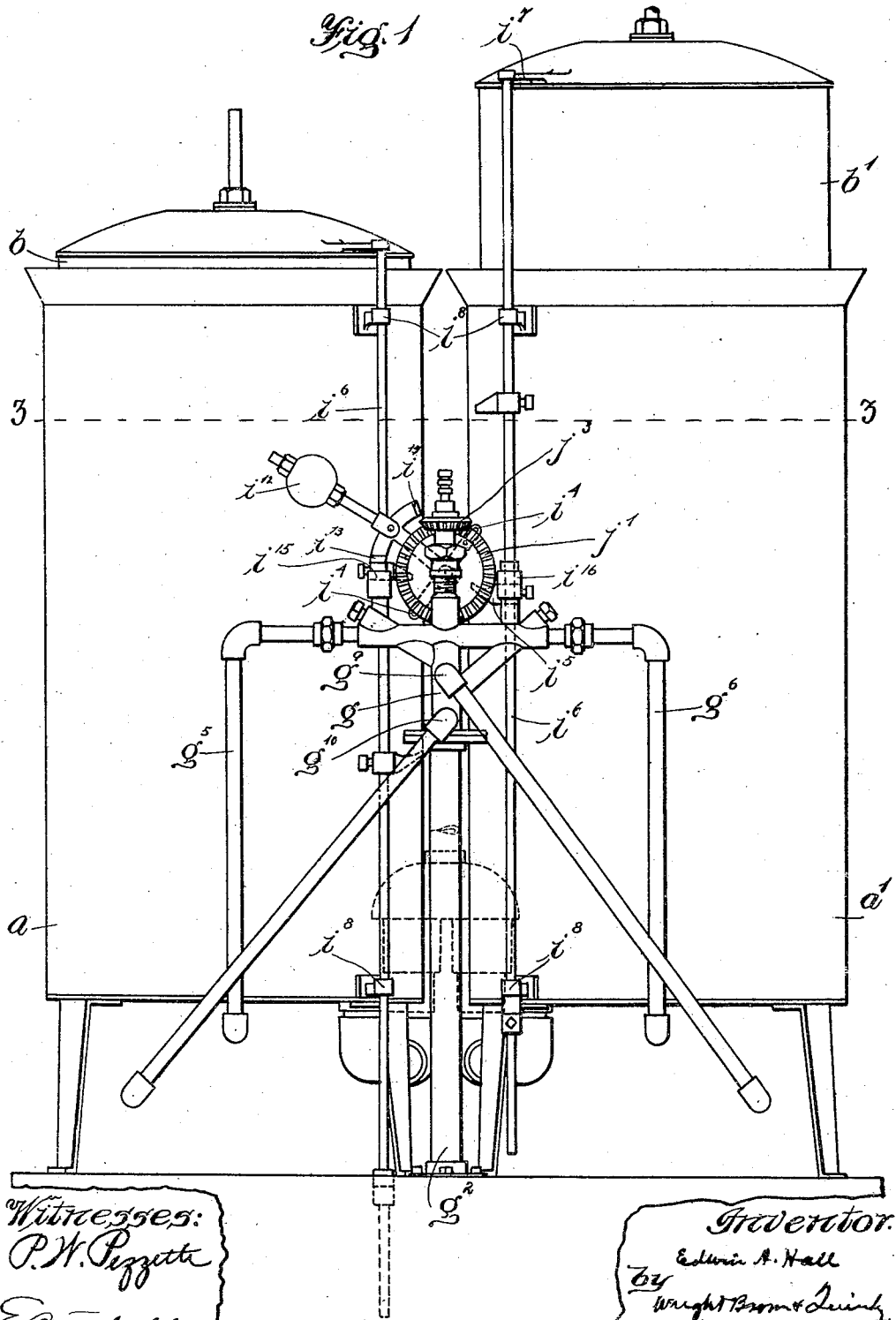

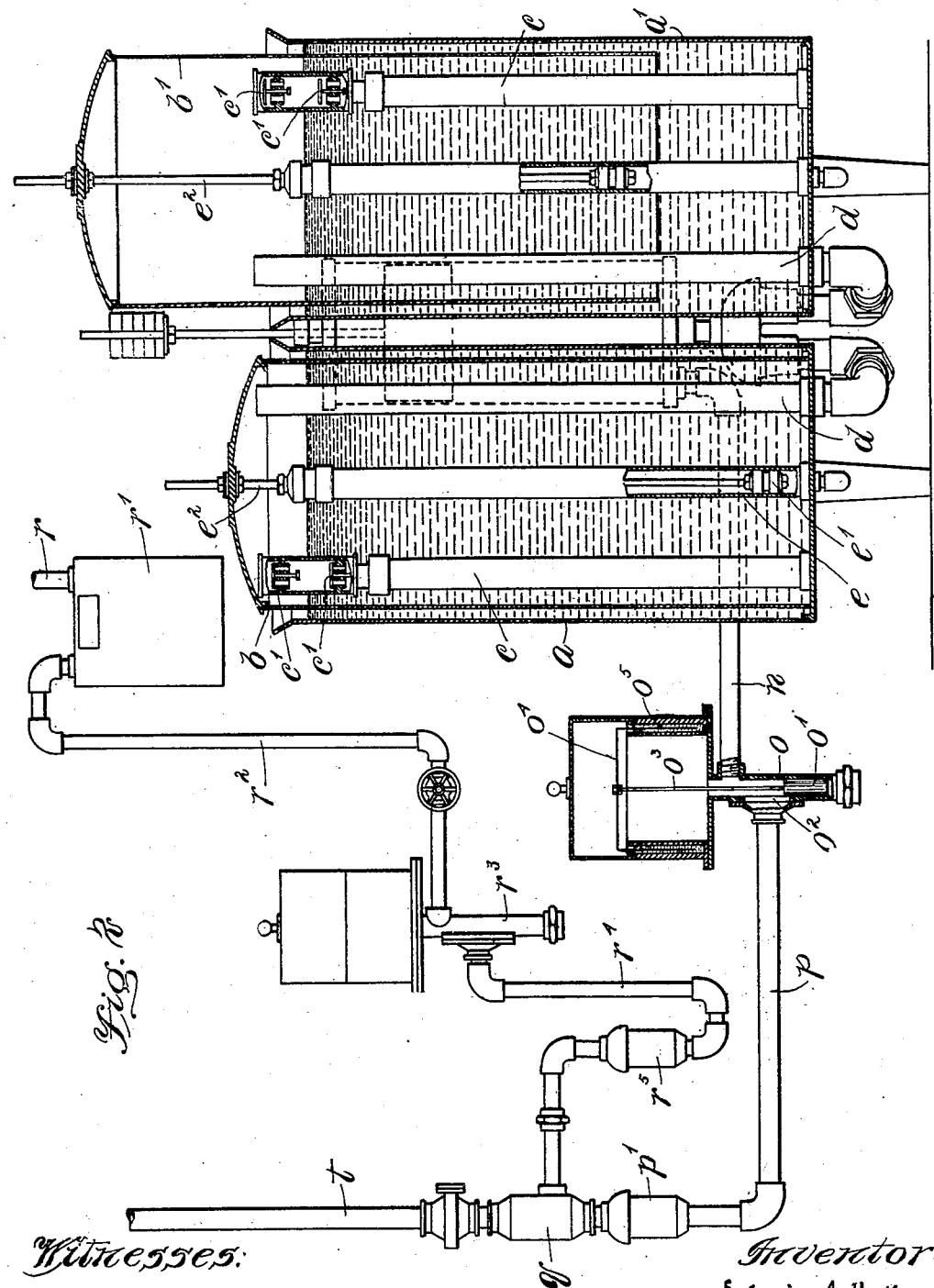

No. 862,732. PATENTED AUG. 6, 1907.
E. A. HALL.
APPARATUS FOR SUPPLYING AIR AND REGULATING PRESSURE THEREOF.
APPLICATION FILED AUG. 25, 1904.
7 SHEETS—SHEET 3.
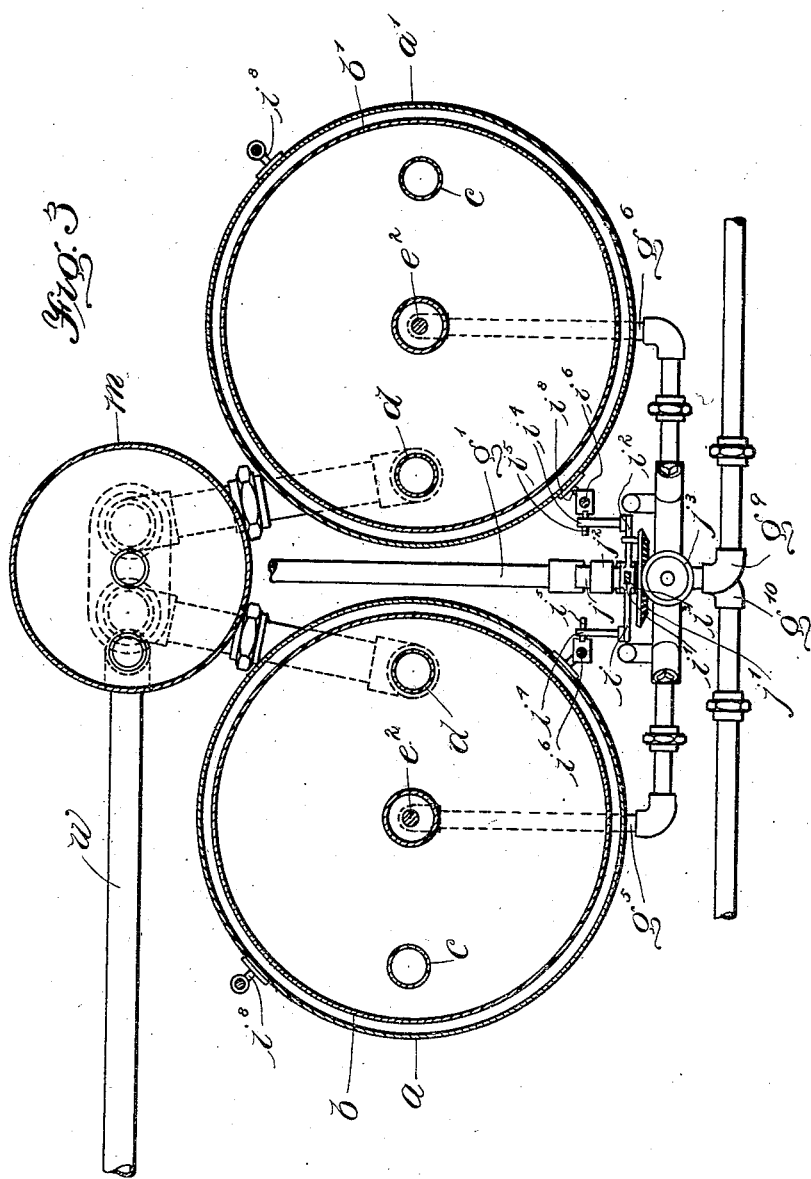
Witnesses:
P. W. Pezzetti
E. Batchelder
Inventor:
Edwin A. Hall
by Wright Brown & Quinby
Attorneys.

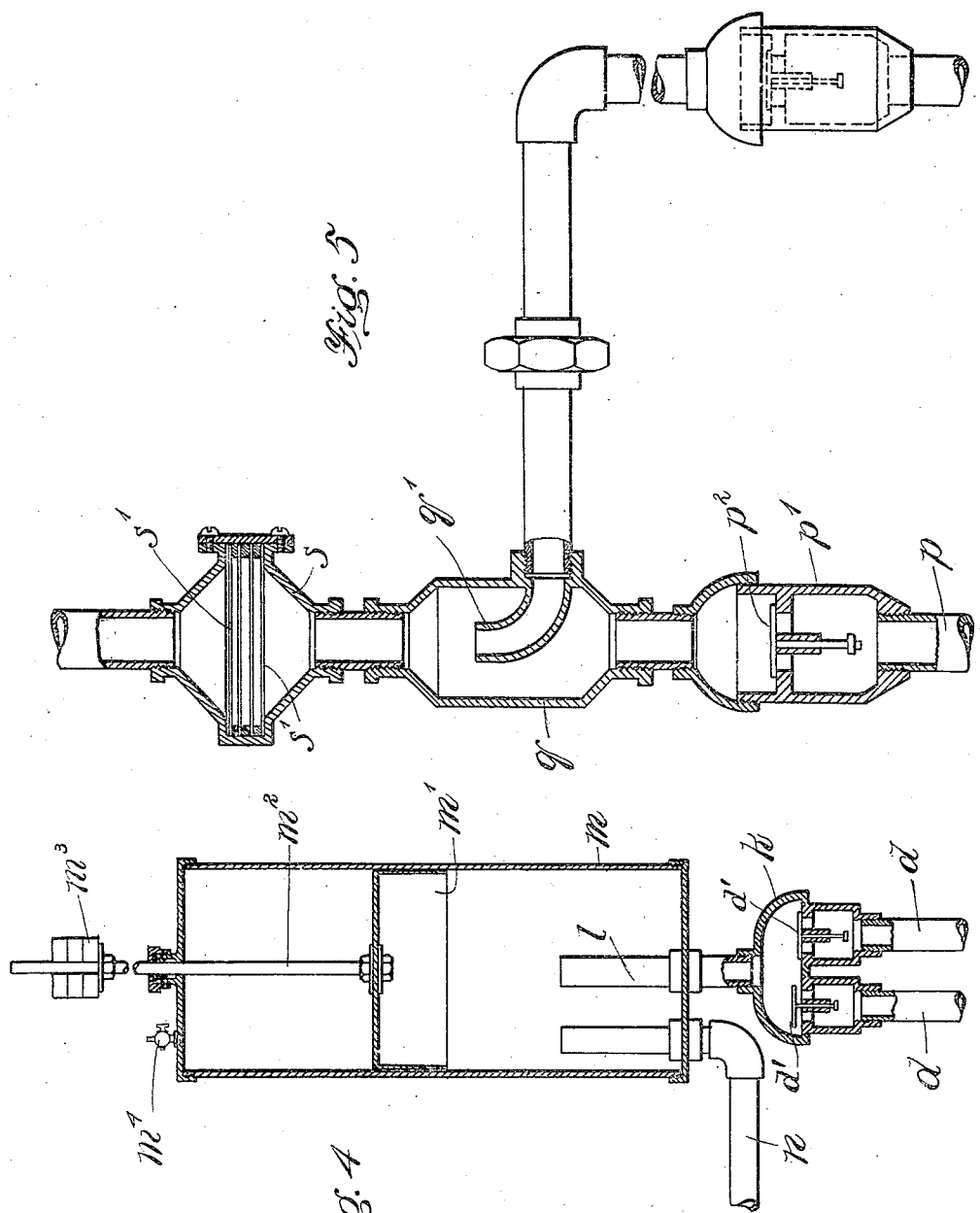

No. 862,732. PATENTED AUG. 6, 1907.
E. A. HALL.
APPARATUS FOR SUPPLYING AIR AND REGULATING PRESSURE THEREOF.
APPLICATION FILED AUG. 25, 1904.
7 SHEETS—SHEET 5.
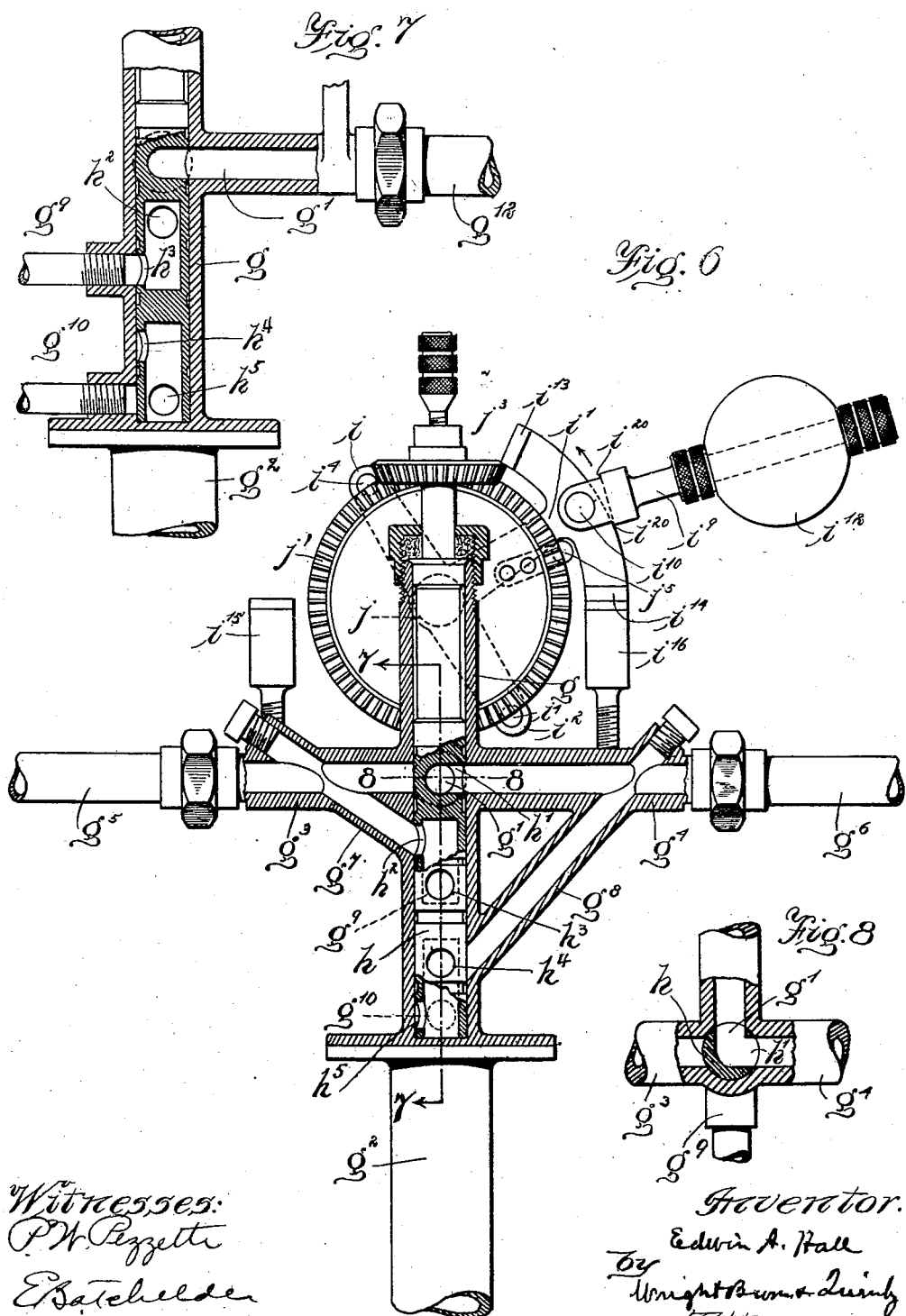

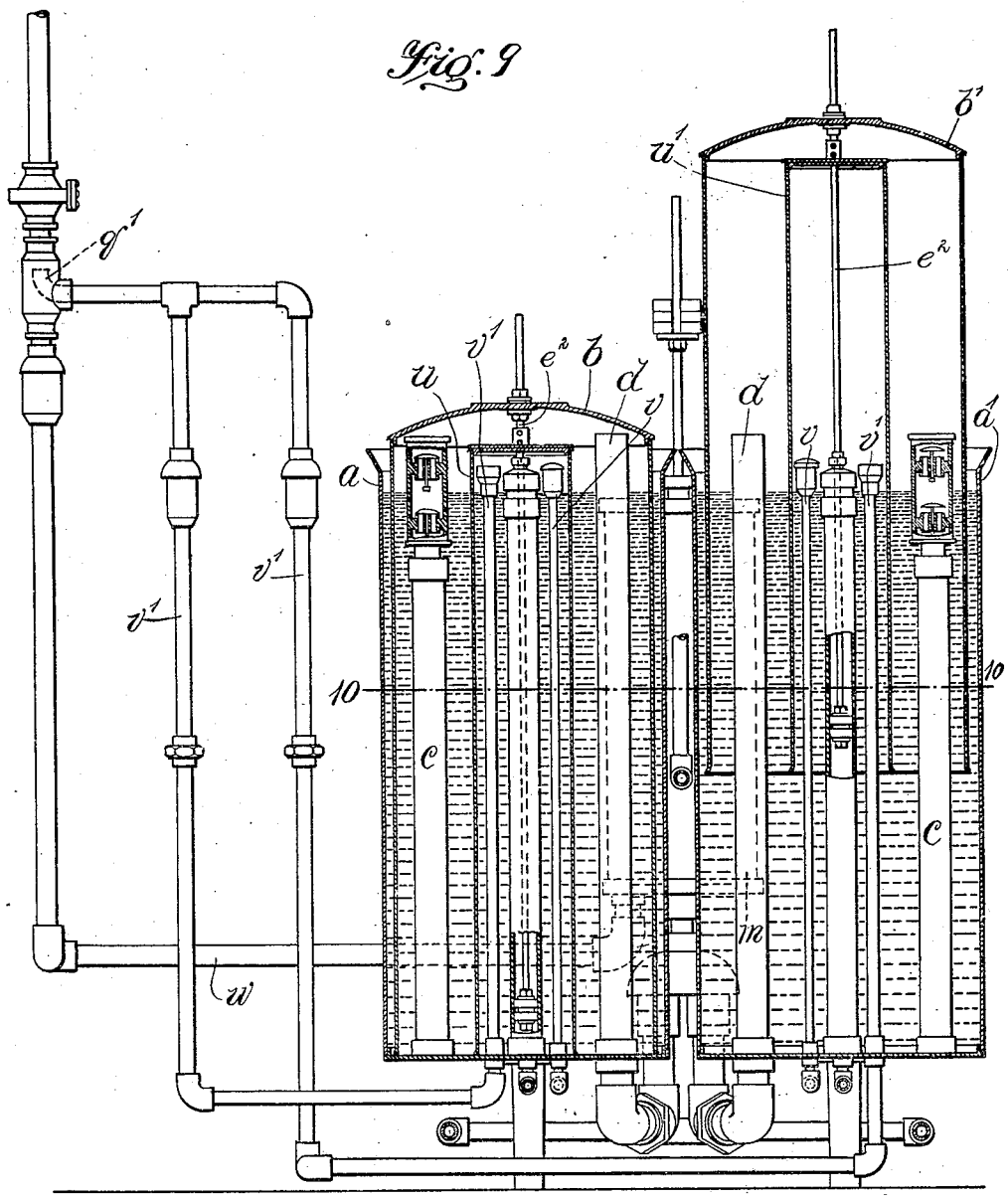

No. 862,732. PATENTED AUG. 6, 1907.
E. A. HALL.
APPARATUS FOR SUPPLYING AIR AND REGULATING PRESSURE THEREOF.
APPLICATION FILED AUG. 25, 1904.
7 SHEETS—SHEET 7.
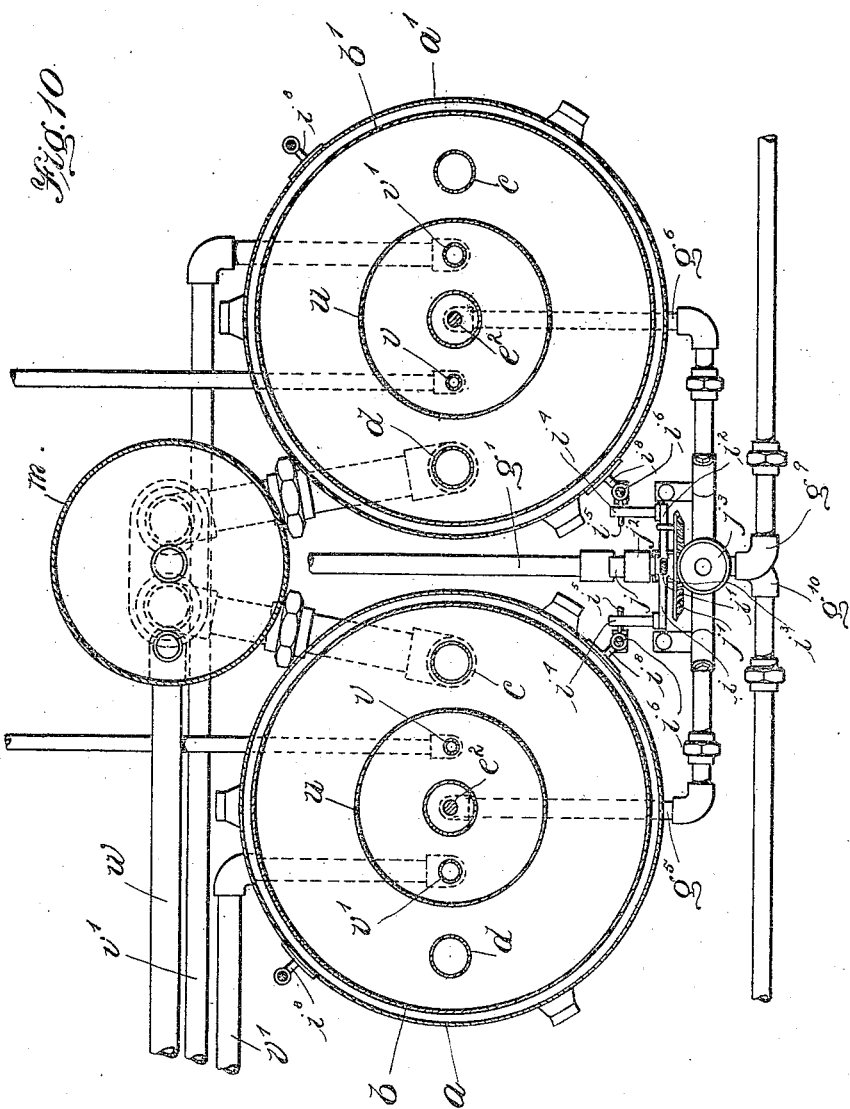

UNITED STATES PATENT OFFICE.

EDWIN A. HALL, OF HYDE PARK, MASSACHUSETTS, ASSIGNOR TO AIRIFIED GAS HEATING AND POWER COMPANY, OF BOSTON, MASSACHUSETTS, A CORPORATION OF ARIZONA TERRITORY.

APPARATUS FOR SUPPLYING AIR AND REGULATING PRESSURE THEREOF.

No. 862,732.     Specification of Letters Patent.     Patented Aug. 6, 1907.

Application filed August 25, 1904. Serial No. 222,103.

*To all whom it may concern:*

Be it known that I, EDWIN A. HALL, of Hyde Park, in the county of Norfolk and State of Massachusetts, have invented certain new and useful Improvements in Apparatus for Supplying Air and Regulating Pressure Thereof, of which the following is a specification.

This invention relates to apparatus for mixing air and gas, to produce a combustible mixture adapted for either illuminating or heating purposes.

The invention has for its object to provide an apparatus which shall deliver air and gas simultaneously to a mixing-chamber of small capacity, the apparatus being free from any storage-reservoir in which either the air or the gas is stored for any considerable length of time, one object of the invention being to provide a mixing apparatus which shall be free from danger of explosion, owing to the fact that no considerable body of gas or of a mixture of gas and air is stored at any part of the apparatus, the absence of a storage-reservoir reducing the bulk of the apparatus to the minimum.

The invention consists in the several improvements which I will now proceed to describe and claim.

Of the accompanying drawings, forming a part of this specification,—Figure 1 represents a side elevation of an apparatus embodying my invention, omitting the mixer. Fig. 2 represents a partial sectional view and partial side elevation, showing an apparatus embodying my invention. Fig. 3 represents a horizontal sectional view. Fig. 4 represents a sectional view of the pressure-equalizer. Fig. 5 represents a sectional view of the mixer. Fig. 6 represents a sectional view of the valve-casing hereinafter referred to, the valve being shown partly in section and partly in elevation. Fig. 7 represents a section on line 7—7 of Fig. 6. Fig. 8 represents a section on line 8—8 of Fig. 6. Fig. 9 represents a partial sectional view and partial side elevation of another form of apparatus embodying my invention. Fig. 10 represents a section on line 10—10 of Fig. 9.

The same reference characters indicate the same parts in all the figures.

In the drawings,—$a$ $a'$ represent two tanks, each open at its upper end, and adapted to hold a body of water.

$b$ $b'$ represent inverted air-pumping tanks or air-bells, each open at its lower end, the said bells being movable vertically in the tanks $a$ $a'$, and sealed at their lower ends by the water in the tanks, each tank and bell constituting an air-pump. Into each bell extends an air-induction pipe $c$ open to the atmosphere at the bottom of the tank, and extending above the sealing liquid, the said pipe having valves $c'$ $c'$ at its upper portion, adapted to permit the entrance of air to the bell, and prevent the escape of air from the bell, through the pipe $c$. From each bell extends an air-outlet pipe $d$, which passes through the bottom of the tank and communicates with the bell above the sealing liquid. Each bell is alternately raised to draw air through its induction-pipe, and released and allowed to descend from its raised position to force the air through the outlet-pipe, this being effected by hydraulic motors in the tanks $a$ $a'$. Each motor comprises a cylinder $e$ affixed to the bottom of the tank, a piston $e'$ in the cylinder, and a rod $e^2$ extending through a stuffing-box at the upper end of the cylinder and secured to the head of the bell. Water under pressure is alternately admitted to and shut off from the cylinder, the water raising the piston and the bell connected therewith. When the water is shut off from the cylinder, a vent from the latter is opened, so that the water in the cylinder is released, and the piston and bell are allowed to descend, the descent of the bell forcing the air through the outlet-pipe. The two motors are operated alternately, so that when one air-bell is rising, the other is descending. To this end, water is admitted to the cylinders $e$ $e$, alternately, by the means next described.

$g$ represents a valve-casing having an inlet-branch $g'$ connected by a pipe $g^{12}$ with a source of supply of water under pressure, and supported by a standard $g^2$ in suitable proximity to the tanks $a$ $a'$. The valve-casing $g$ is provided with two oppositely extending outlet-branches $g^3$ $g^4$, one of which is connected by a pipe $g^5$ with the cylinder in the tank $a$, and the other by a pipe $g^6$ with the cylinder in the tank $a'$. The branch $g^3$ is connected by a waste-passage $g^7$ with one side of the valve-casing, while the branch $g^4$ is connected by a waste-passage $g^8$ with the opposite side of the casing, the waste-passages communicating with the casing at different distances from the branches $g^3$ $g^4$, which are in alinement with each other.

$g^9$ $g^{10}$ represent waste-outlets in the casing $g$, the port $g^9$ being operatively related to the waste-passage $g^7$, while the port $g^{10}$ is operatively related to the waste-passage $g^8$.

$h$ represents a cylindrical valve fitted to rotate in the casing $g$ and provided with a passage $h'$ (Fig. 8) adapted to connect the inlet-passage $g'$ with either the outlet-branch $g^3$ or the outlet-branch $g^4$, a quarter-rotation of the valve being sufficient to change the connection. The valve has a pair of waste-ports $h^2$ $h^3$, adapted to register respectively with the waste-passage $g^7$ and the waste-outlet $g^9$. The valve also has another pair of waste-ports $h^4$ $h^5$, adapted to register respectively with the waste-passage $g^8$ and the waste-outlet $g^{10}$. The valve is chambered, to connect the ports of each pair, as shown in Fig. 7. The valve is partially rotated during the upward movements of each air-bell, by mechanism hereinafter described, the organization being such that when one bell approaches the extreme of its upward movement, the valve is turned to shut off the impelling water from the motor of that bell, and at the same time connect said motor with one of the waste-outlets, the valve also at the same time admitting water to the motor of the other air-bell, and disconnecting the last-mentioned motor from the corresponding waste-outlet, so that each bell commences to rise when the other commences to descend. When the valve is in the position shown in Figs. 6 and 8, the inlet-branch $g'$ is connected by the valve-passage $h'$ with the outlet-branch $g^4$ communicating with the cylinder of the motor in the tank $a'$, and the cylinder of the motor in the tank $a$ is connected through the waste-passage $g^7$ of the casing and the ports $h^2$ $h^3$ of the valve, with the waste-pipe $g^9$. When the valve is in its opposite position, the inlet-branch $g'$ is connected by the valve-passage $h'$ with the outlet-branch $g^3$ communicating with the motor cylinder in the tank $a$, the motor cylinder in the tank $a'$ being connected through the waste-passage $g^8$ of the casing and the ports $h^4$ $h^5$ of the valve, with the waste-pipe $g^{10}$.

The mechanism for turning or shifting the valve is described as follows: $i$ $i'$ $i^2$ are three arms radiating from a hub $i^3$, which is adapted to turn on a short shaft $j$, to which is affixed a bevel-gear $j'$. The arms $i$ $i^2$ project in opposite directions, and are at right angles with the arm $i'$. Each of the arms $i$ $i^2$ has a stud $i^4$ at its outer end, adapted to engage a dog $i^5$, which moves with the adjacent air-bell. Each bell carries a dog $i^5$, which is connected with the bell by a rod $i^6$ affixed to an arm $i^7$ on the upper portion of the bell and movable in guides $i^8$ on the corresponding tank. The shaft $j$ is journaled in a fixed bearing $j^2$ (Fig. 3). The bevel-gear $j'$ on said shaft meshes with a bevel-gear $j^3$ affixed to the stem of the valve $h$. The central arm $i'$ has an extension $i^9$ pivoted to it at $i^{10}$, said extension having a weight $i^{12}$. The arm $i'$ also has two oppositely extending projections $i^{13}$ $i^{14}$, adapted to abut against fixed stops $i^{15}$ $i^{16}$ at opposite sides of the center of oscillation of the arm.

I will assume that the bell $b'$ in rising has caused its dog $i^5$ to engage the stud $i^4$ on the arm $i^2$. The movement imparted to the dog while it is engaged with said stud is sufficient to move the arms $i$ $i'$ $i^2$ and extension $i^9$ from the position shown in Fig. 6, toward the position shown in Fig. 1, the arm $i'$ being moved in the direction of the arrow in Fig. 6, until the weighted extension has crossed the center of motion, whereupon the said extension and the connected parts move by gravitation to the position shown in Fig. 1. The gear $j'$ has a stud $j^5$, which projects between the arms $i'$ and $i^2$. When the said arms are in the position shown in Fig. 6, the arm $i'$ bears against said stud, the latter being separated from the arm $i^2$; consequently during a part of the above-described movement of the connected arms, the stud $j^5$ and gear $j'$ remain stationary, the arrangement being such that as arm $i^2$ moves under the action of gravity it strikes the stud and gives the gear a suitable partial rotation to shift the valve from one position to the other. The arm $i'$, its extension $i^9$, and the arms $i$ and $i^2$, constitute a gravity motor, the operation of which is started alternately by the holders $b$, $b'$, as they rise, the said operation being completed independently of said holders by the gravitation of weight $i^{12}$. The provision afforded by the stud $j^5$ and arms $i'$ $i^2$ for a considerable movement of said motor before it engages and moves the gear $j'$ enables the motor to have a movement of sufficient amplitude, and to move the valve quickly during the latter part only of its movement. The pivotal connection between the arm $i'$ and the weighted extension $i^9$ enables the extension to move to a limited extent, independently of the arm, the extension swinging on the pivot $i^{10}$ to the extent permitted by shoulders $i^{20}$ on the extension and the projections $i^{13}$ $i^{14}$ on the arm. This independent movability of the extension increases its momentum during the gravitating movement of the motor.

The air-outlet pipes $d$ $d$ from the two bells discharge into a chamber $k$ (Fig. 4), which is connected by a pipe $l$ with a cylinder $m$ forming a part of a pressure-equalizer, the other parts of which are a piston $m'$ having a sliding fit in said cylinder, and a rod $m^2$ passing through a stuffing-box in one end of the cylinder and provided with one or more weights $m^3$, which are preferably removable. A pipe $n$ conducts the air away from the cylinder. The air entering the cylinder is subjected to constant pressure by the weighted piston, so that the pressure in the pipe $n$ is not affected by the stoppages and reversals of movement of the air-bells. The cylinder $m$ is provided at its upper end with an air-cock $m^4$, to permit the escape of air displaced by the piston. Said cock may be adjusted to regulate the movement of air therethrough. The pipes $d$ $d$ are provided with valves $d'$ $d'$ adapted to prevent backward movement of air in said pipes.

The outlet-pipe $n$ delivers air to a casing $o$ forming a part of a pressure-governor which includes a valve $o'$ adapted to vary the area of an outlet-port $o^2$, through which air passes from the casing $o$ through a pipe $p$, to a mixing-chamber $q$. The port $o^2$ is a narrow elongated slot extending lengthwise of the casing $o$, and the valve, which is movable lengthwise of the casing, varies the operative length of the port when it is raised or lowered. The stem $o^3$ of the valve is attached to an inverted cup or bell $o^4$, which floats in and is sealed by a body of mercury confined between the two concentric walls of a chamber $o^5$. An increase in the air-pressure will raise the cup $o^4$ and valve $o'$, causing the latter to decrease the flow of air to the mixing-chamber, while a decrease in the air-pressure will permit the depression of the cup and valve, and increase the flow of air. A practically uniform supply of air is thus insured.

The pipe $p$ has an enlargement $p'$, forming a valve-chamber, in which is a valve $p^2$ adapted to prevent the air from passing backwardly through the pipe $p$. The mixing-chamber $q$ receives air from the pipe $p$, and is provided with an inlet $q'$ (Fig. 5), through which gas enters the chamber. The gas is delivered by a conduit which includes a pipe $r$ (Fig. 2) connected with a source of gas-supply under pressure, a meter $r'$, a pipe $r^2$, a valve-casing $r^3$, which is similar to the casing $o'$ and forms a part of a gas-pressure regulator of the same construction as the air-pressure regulator above described, and a pipe $r^4$ having an enlargement or valve-chamber $r^5$ containing a valve similar to valve $p^2$ in casing $p'$ adapted to prevent backward passage of gas. The pipe $r^4$ communicates with the gas-inlet $q'$, which is elbow-shaped and directs the gas toward the delivering end of the mixing-chamber. $s$ represents a supplemental mixing-chamber, connected with the chamber $q$, and provided with several wire-gauze partitions $s'$, through which the gas and air pass, said partitions insuring a thorough mixture of the gas and air, the mixture passing through a service-pipe to the burners.

The embodiment of my invention thus far described is adapted to furnish a mixture of gas and air for illuminating purposes, the mixture being burned preferably under incandescent mantles.

In Figs. 9 and 10, I show a different embodiment of my invention, adapted more particularly for heating purposes. In this embodiment, gas-pumping bells $u\ u'$ are connected and operated with the air-pumping bells $b\ b'$, the gas-bells being constructed like the air-bells. Each gas-bell is affixed at its closed top to one of the piston-rods $e^2$. Each gas-bell is provided with a gas-inlet pipe $v$ communicating with a source of supply of gas under pressure, and with a gas-outlet pipe $v'$, the outlet-pipes of the two gas-bells being connected with the gas-inlet $q'$ of the mixing-chamber, as shown in Fig. 9. The gas is therefore supplied or pumped continuously to the mixing-chamber by the gas-bells $u\ u'$, instead of by the means shown in Fig. 2, the apparatus being in all other respects the same as that shown in Figs. 1 to 8, inclusive, excepting that the air-pressure regulator, including the float-controlled valve $o'$ and the corresponding gas-pressure regulator shown in Fig. 2, are omitted, the air passing from the cylinder $m$ of the pressure-equalizer directly to the mixing-chamber through a pipe $w$.

It will be seen that each embodiment of my invention above described comprises two alternately acting pumps, which coöperate in forcing fluid continuously to the mixer, there being no storage-reservoir between the pump and the mixer. The size of the apparatus may therefore be reduced to the minimum, the space occupied by the two pumps being considerably less than would be required for one pump and a storage-reservoir fed thereby, of sufficient capacity to continuously supply the mixing-chamber. Moreover, the two alternately acting pumps supply air or air and gas to the mixer under a more uniform pressure than would be the case if a single pump and a storage-reservoir fed thereby were employed. When exact uniformity in the relative proportions of air and gas is not important, as is the case when the gas is used for illuminating purposes with a Welsbach or other mantle, the gas may come directly from the street mains, the two pumps supplying air only, as shown in Fig. 2. The connected gas and air pumping bells shown in Figs. 9 and 10 insure absolute uniformity in the relative proportions of air and gas supplied to the mixer; hence this form of apparatus is preferable when the mixture is used for heating purposes.

I claim:

1. An apparatus of the character described comprising a pair of alternately operated pumping bells, a pressure equalizer having an outlet pipe, a valve regulating the discharge through said outlet pipe, and means independent of said equalizer for controlling said valve, the operation of said controlling means being governed by the pressure in said outlet pipe.

2. An apparatus of the character described comprising a pair of alternately operated pumping bells, a pressure equalizer having an outlet pipe, a reciprocable valve for regulating the discharge through said outlet pipe, said valve having a stem, and means connected to said valve stem and independent of said equalizer for reciprocating said valve.

3. An apparatus of the character described comprising pumping members, a pressure equalizer, a valve casing connected to the discharge from said equalizer and having an elongated outlet slot, a valve working in said casing, and a float controlling the movement of said valve.

4. An apparatus of the character described comprising pumping members, a pressure equalizer, a valve casing connected to the discharge from said equalizer and having an outlet, a valve controlling said outlet, a float casing communicating with said valve casing, and a float therein connected to said valve, the movement of said float being controlled by the pressure in said equalizer.

In testimony whereof I have affixed my signature, in presence of two witnesses.

EDWIN A. HALL.

Witnesses:
WILLIAM QUINBY,
J. H. BROWN.